(12) United States Patent
Sharifi et al.

(10) Patent No.: US 11,341,954 B2
(45) Date of Patent: May 24, 2022

(54) TRAINING KEYWORD SPOTTERS

(71) Applicant: Google LLC, Mountain View, CA (US)

(72) Inventors: Matthew Sharifi, Kilchberg (CH); Kevin Kilgour, Mountain View, CA (US); Dominik Roblek, Meilen (CH); James Lin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 350 days.

(21) Appl. No.: 16/717,518

(22) Filed: Dec. 17, 2019

(65) Prior Publication Data

US 2021/0183367 A1 Jun. 17, 2021

(51) Int. Cl.
| | | |
|---|---|---|
| G10L 15/06 | (2013.01) | |
| G06N 3/04 | (2006.01) | |
| G06N 3/08 | (2006.01) | |
| G10L 13/00 | (2006.01) | |
| G10L 15/16 | (2006.01) | |
| G10L 15/22 | (2006.01) | |
| G10L 15/08 | (2006.01) | |

(52) U.S. Cl.
CPC .............. *G10L 15/063* (2013.01); *G06N 3/04* (2013.01); *G06N 3/08* (2013.01); *G10L 13/00* (2013.01); *G10L 15/16* (2013.01); *G10L 15/22* (2013.01); *G10L 2015/088* (2013.01); *G10L 2015/223* (2013.01)

(58) Field of Classification Search
CPC ........................ G10L 15/063; G10L 2015/088
See application file for complete search history.

(56) References Cited

U.S. PATENT DOCUMENTS

| | | | | |
|---|---|---|---|---|
| 9,548,053 | B1* | 1/2017 | Basye | G06F 16/683 |
| 9,589,563 | B2* | 3/2017 | Zhao | G10L 15/19 |
| 9,600,231 | B1* | 3/2017 | Sun | G10L 15/02 |
| 10,210,860 | B1* | 2/2019 | Ward | G10L 15/30 |
| 10,535,354 | B2* | 1/2020 | Alvarez Guevara | G10L 15/1815 |
| 10,642,577 | B2* | 5/2020 | Spector | G06F 3/167 |

(Continued)

OTHER PUBLICATIONS

A Comprehensive Hands-on Guide to Transfer Learning with Real-World Applications in Deep Learning; Dipanjan Sarkar, Nov. 15, 2018.

(Continued)

*Primary Examiner* — Matthew H Baker
(74) *Attorney, Agent, or Firm* — Honigman LLP; Brett A. Krueger; Grant Griffith

(57) ABSTRACT

A method of training a custom hotword model includes receiving a first set of training audio samples. The method also includes generating, using a speech embedding model configured to receive the first set of training audio samples as input, a corresponding hotword embedding representative of a custom hotword for each training audio sample of the first set of training audio samples. The speech embedding model is pre-trained on a different set of training audio samples with a greater number of training audio samples than the first set of training audio samples. The method further includes training the custom hotword model to detect a presence of the custom hotword in audio data. The custom hotword model is configured to receive, as input, each corresponding hotword embedding and to classify, as output, each corresponding hotword embedding as corresponding to the custom hotword.

28 Claims, 7 Drawing Sheets

(56) References Cited

U.S. PATENT DOCUMENTS

2020/0349927 A1\* 11/2020 Stoimenov .............. G10L 17/24
2021/0035565 A1\* 2/2021 Ward ...................... G06N 3/08

OTHER PUBLICATIONS

Training Neural Speech Recognition Systems with Synthetic Speech Augmentation; Jason Li et. al; Nov. 2, 2018.
International Search Report, PCT Application No. PCT/US2020/065445, dated Dec. 16, 2020, 16 pages.
Lin et al: "Training Keyword Spotters with Limited and Synthesized Speech Data", IEEE International Conference on Acoustics, Speech and Signal Processing (ICASSP), Jan. 31, 2020, pp. 7474-7478, XP055776057, 5 pages.
Sun et al: "Compressed Time Delay Neural Network for Small-Footprint Keyword Spotting", Interspeech, Jan. 1, 2017, 5 pages.
Ramanan et al: "Eliminating Data Collection Bottleneck for Wake Word Engine Training Using Found and Synthetic Data", IEEE Int. Cont. on Big Data, Dec. 9, 2019 10 pages.

\* cited by examiner

TRAINING KEYWORD SPOTTERS

TECHNICAL FIELD

This disclosure relates to training keyword spotters.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Neural networks have recently emerged as an attractive solution for training models to detect hotwords spoken by users in streaming audio. Typically, systems used to detect hotwords are trained to recognize pre-set hotwords with little to no hotword customization. These systems can therefore train with large sets of data to generate robust hotword detection for pre-set hotwords, but generally do not have the luxury of such large sets of data for training models to similarly detect custom hotwords.

SUMMARY

One aspect of the disclosure provides a method for training a custom hotword model. The method includes receiving, at data processing hardware, a first set of training audio samples each containing a custom hotword. The custom hotword includes one or more words. The method also includes generating, by the data processing hardware, using a speech embedding model configured to receive the first set of training audio samples as input, a corresponding hotword embedding representative of the custom hotword for each training audio sample of the first set of training audio samples. The speech embedding model is pre-trained on a second set of training audio samples different than the first set of training audio data. The second set of training audio samples including a greater number of training audio samples than the first set of training audio samples. The method further includes training, by the data processing hardware, the custom hotword model to detect a presence of the custom hotword in audio data. The custom hotword model is configured to receive, as input, each corresponding hotword embedding generated using the speech embedding model. The custom hotword model is also configured to classify, as output, each corresponding hotword embedding as corresponding to the custom hotword.

Implementations of the disclosure may include one or more of the following optional features. In some implementations, after training the custom hotword model, the method includes receiving, at the data processing hardware residing on a user device, streaming audio data captured by the user device and determining, by the data processing hardware, using the trained custom hotword model, whether the custom hotword is present in the streaming audio data. In this implementation, when the custom hotword is present in the streaming audio data, the method includes initiating, by the data processing hardware, a wake-up process on the user device for processing the custom hotword and/or one or more other terms following the custom hotword in the streaming audio data.

In some configurations, a remote system pre-trains the speech embedding model on the second set of training audio samples. In this configuration, the second set of training audio samples includes positive training audio samples containing a corpus of target hotwords spoken by one or more different speakers and negative training audio samples not containing any of the target hotwords from the corpus of target hotwords. Here, the remote system may be configured to pre-train the speech embedding model by partitioning the corpus of target hotwords into a plurality of random groups of target hotwords, each group of target hotwords including a respective set of one or more target hotwords from the corpus of target hotwords. For each group of target hotwords partitioned from the corpus of target hotwords, the remote system may also be configured to pre-train the speech embedding model by training a respective pre-training hotword model on top of the speech embedding model to detect a presence of any of the target hotwords from the respective group of target hotwords in the second set of training audio samples. The remote system may be further configured to pre-train the speech embedding model by training the speech embedding model to learn a representative speech embedding for the plurality of random groups of target keywords.

In some examples, the first set of training audio samples includes synthesized speech utterances of the custom hotword output from one or more speech synthesis systems. In other examples, the first set of training audio samples includes one or more human-generated speech utterances corresponding to a user speaking the custom hotword and a plurality of synthesized speech utterances of the custom hotword output from one or more speech synthesis systems. Here, at least one synthesized speech utterance of the plurality of synthesized speech utterances may include a different synthetic voice than the other synthesized speech utterances of the plurality of synthesized speech utterances. The method may include receiving, at the data processing hardware, input text corresponding to the custom hotword, the input text input by a user via a graphical user interface executing on the data processing hardware, and generating, by the data processing hardware, using the input text as input to the one or more speech synthesis systems, the plurality of synthesized speech utterances of the custom hotword. Optionally, the method may include receiving, at the data processing hardware, the one or more human-generated speech utterances corresponding to the user speaking the custom hotword, generating, by the data processing hardware, a transcription of at least one of the one or more human-generated speech utterances, and generating, by the data processing hardware, using the transcription of the at least one of the one or more human-generated speech utterances as input to the one or more speech synthesis systems, the plurality of synthesized speech utterances of the custom hotword.

In some implementations, the speech embedding model includes five convolutional blocks. In this implementation, the custom hotword model includes one convolutional block configured to receive, as input, an output from a last convolutional of the five convolutional blocks of the speech embedding model and includes a classification block configured to receive, as input, an output from the convolutional block. Each convolutional block of the speech embedding model and the custom hotword model may include four convolutional layers and a maxpool layer. The classification block of the custom hotword model may include a maxpool layer followed by one of a convolutional layer or a fully connected layer.

In some configurations, the data processing hardware resides on a user device associated with a user. Here, a user of the user device may assign the custom hotword to the user device.

Another aspect of the disclosure provides a system for training a custom hotword model. The system includes data processing hardware and memory hardware in communication with the data processing hardware. The memory hardware stores instructions that when executed on the data processing hardware cause the data processing hardware to perform operations. The operations include receiving a first set of training audio samples each containing a custom hotword, the custom hotword including one or more words. The operations also include generating, using a speech embedding model configured to receive the first set of training audio samples as input, a corresponding hotword embedding representative of the custom hotword for each training audio sample of the first set of training audio samples. The speech embedding model is pre-trained on a second set of training audio samples different than the first set of training audio data. The second set of training audio samples includes a greater number of training audio samples than the first set of training audio samples. The operations further include training a custom hotword model to detect a presence of the custom hotword in audio data. The custom hotword model is configured to receive, as input, each corresponding hotword embedding generated using the speech embedding model and classify, as output, each corresponding hotword embedding as corresponding to the custom hotword.

This aspect may include one or more of the following optional features. In some examples, the data processing hardware resides on a user device and the operations include, after training the custom hotword model, receiving streaming audio data captured by the user device and determining, using the trained custom hotword model, whether the custom hotword is present in the streaming audio data. In this example, when the custom hotword is present in the streaming audio data, the operations include initiating a wake-up process on the user device for processing the custom hotword and/or one or more other terms following the custom hotword in the streaming audio data.

In some implementations, a remote system pre-trains the speech embedding model on the second set of training audio samples. In this implementation, the second set of training audio samples includes positive training audio samples containing a corpus of target hotwords spoken by one or more different speakers and negative training audio samples not containing any of the target hotwords from the corpus of target hotwords. Here, the remote system may be configured to pre-train the speech embedding model by partitioning the corpus of target hotwords into a plurality of random groups of target hotwords, each group of target hotwords including a respective set of one or more target hotwords from the corpus of target hotwords. Additionally, for each group of target hotwords partitioned from the corpus of target hotwords, the remote system may be configured to pre-train the speech embedding model by training a respective pre-training hotword model on top of the speech embedding model to detect a presence of any of the target hotwords from the respective group of target hotwords in the second set of training audio samples and training the speech embedding model to learn a representative speech embedding for the plurality of random groups of target keywords.

In some configurations, the first set of training audio samples includes synthesized speech utterances of the custom hotword output from one or more speech synthesis systems. In other configurations, the first set of training audio samples includes one or more human-generated speech utterances corresponding to a user speaking the custom hotword and a plurality of synthesized speech utterances of the custom hotword output from one or more speech synthesis systems. Here, at least one synthesized speech utterance of the plurality of synthesized speech utterances may include a different synthetic voice than the other synthesized speech utterances of the plurality of synthesized speech utterances. The operations may include receiving input text corresponding to the custom hotword, the input text input by a user via a graphical user interface executing on the data processing hardware, and generating, using the input text as input to the one or more speech synthesis systems, the plurality of synthesized speech utterances of the custom hotword. Optionally, the operations may include receiving the one or more human-generated speech utterances corresponding to the user speaking the custom hotword, generating a transcription of at least one of the one or more human-generated speech utterances, and generating, using the transcription of the at least one of the one or more human-generated speech utterances as input to the one or more speech synthesis systems, the plurality of synthesized speech utterances of the custom hotword.

In some examples, the speech embedding model includes five convolutional blocks. In this example, the custom hotword model includes one convolutional block configured to receive, as input, an output from a last convolutional of the five convolutional blocks of the speech embedding model and a classification block configured to receive, as input, an output from the convolutional block. Here, each convolutional block of the speech embedding model and the custom hotword model may include four convolutional layers and a maxpool layer. The classification block of the custom hotword model may include a maxpool layer followed by one of a convolutional layer or a fully connected layer.

In some implementations, the data processing hardware resides on a user device associated with a user. Here, a user of the user device may assign the custom hotword to the user device.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
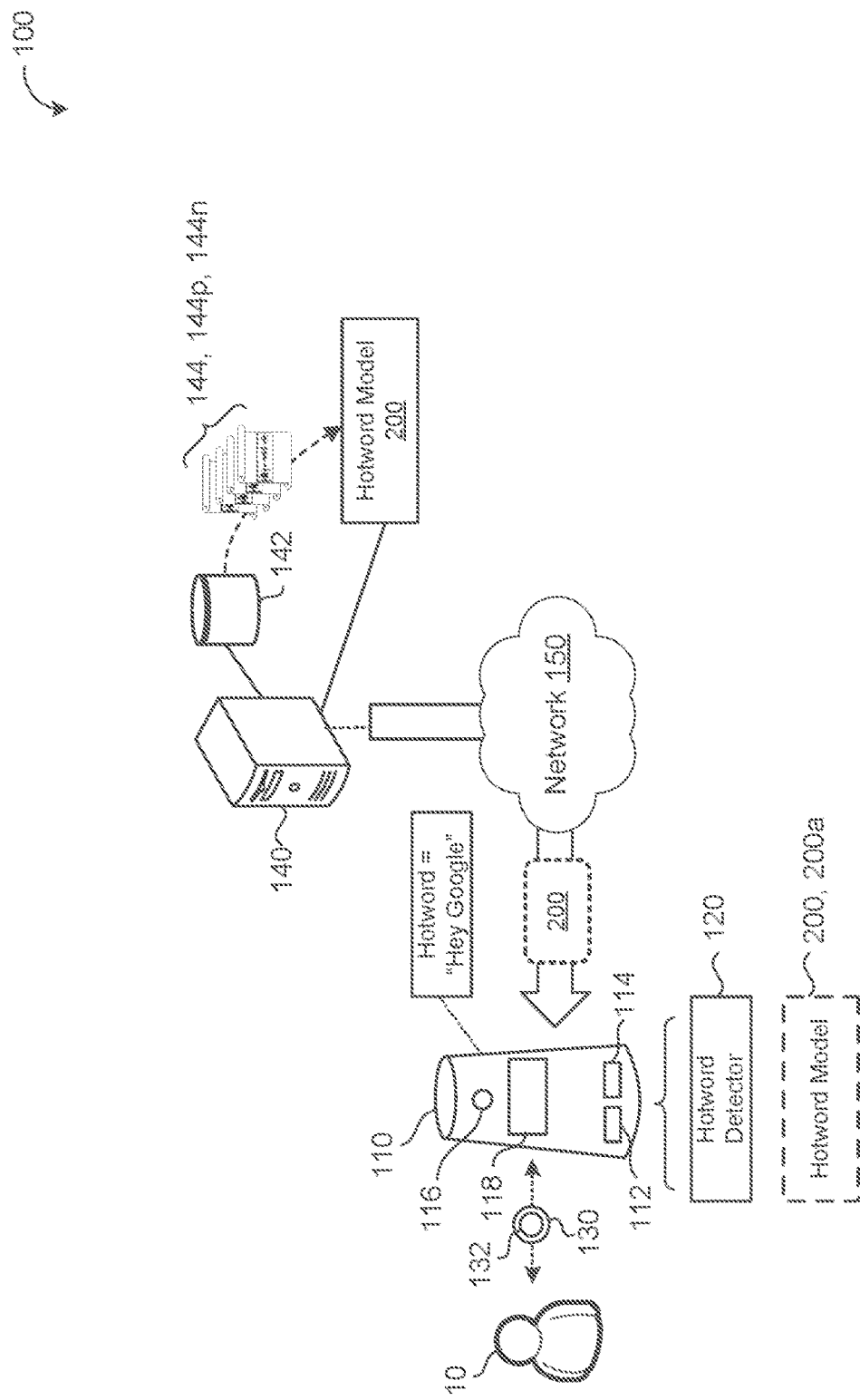
FIGS. 1A-1C are schematic views of examples of speech-enabled environments.

A voice-enabled device (e.g., a user device executing a voice assistant) allows a user to speak a query or a command out loud and field and answer the query and/or perform a function based on the command. Through the use of a "hotword" (also referred to as a "keyword", "attention word", "wake-up phrase/word", "trigger phrase" or "voice action initiation command"), in which by agreement a predetermined term/phrase that is spoken to invoke attention for the voice-enabled device is reserved, the voice-enabled device is able to discern between utterances directed to the system (i.e., to initiate a wake-up process for processing one or more terms following the hotword in the utterance) and utterances directed to an individual in the environment. Typically, the voice-enabled device operates in a sleep state to conserve battery power and does not process input audio data unless the input audio data follows a spoken hotword. For instance, while in the sleep state, the voice-enabled device captures input audio via a microphone and uses a hotword detector trained to detect the presence of the hotword in the input audio. When the hotword is detected in the input audio, the voice-enabled device initiates a wake-up process for processing the hotword and/or any other terms in the input audio following the hotword.

Hotword detection is analogous to searching for a needle in a haystack because the hotword detector must continuously listen to streaming audio, and trigger correctly and instantly when the presence of the hotword is detected in the streaming audio. In other words, the hotword detector is tasked with ignoring streaming audio unless the presence of the hotword is detected. Neural networks are commonly employed by hotword detectors to address the complexity of detecting the presence of a hotword in a continuous stream of audio. A hotword detector typically includes components that convert raw audio signals captured by the microphone of the user device into one or more audio features formatted for processing by the neural network. The neural network is trained to recognize an audio sequence that includes the hotword. Unfortunately, often separate models are required for detecting different hotwords or a model is not adaptable to change a configured hotword.

With the increase in voice-enabled devices, generally there is a need for these devices to be effective at speech recognition while also being efficient in terms of the processing resources that the device uses to perform speech recognition. Accordingly, some voice-enabled devices utilize a cloud computing environment to perform speech recognition, while other voice-enabled devices perform speech recognition on-device. The difference being that generally a wholly on-device approach solely uses resources of the voice-enabled device to perform speech recognition. Each of these approaches may have some drawbacks. For example, by offloading the computation involved in speech recognition to the cloud, a voice-enabled device sends continuous streams of audio captured at the device across a network to the cloud computing environment. Communication of these streams through the network increase latency and also require the voice-enabled device to have a dedicated connection/channel for this constant communication over the network with the cloud computing environment. Although an on-device full speech recognition system may appear to alleviate some of these communication concerns, to have a full speech recognition system on-device often demands an order of magnitude more of processing capability at the voice-enabled device. In some configurations, a user of a voice-enabled device has the option of the voice-enabled device perform speech recognition on-device if the user does not want to provide voice data to a cloud computing environment and/or share what the user is querying for to the cloud computing environment.

To balance these drawbacks, voice-enabled devices include hotword detectors designed to detect only a specific set of hotwords that are relevant to the use of the voice-enabled device. In other words, a hotword detector is configured to perform minimum processing while in a sleep state until a hotword signals that input audio data following a spoken hotword should be processed. This allows the hotword detector to trigger a full speech recognition process that is run on the voice-enabled device, in the cloud, or some combination of the two. Unfortunately, hotword detectors are typically trained on only a specific set of phrases (i.e., hotwords). By being constrained to a specific set of phrases, hotword detectors traditionally have been inflexible to hotword customization. If an entity, such as a user of the voice-enabled device or a manufacturer of the voice-enabled device, wants to implement a custom hotword for the voice-enabled device, the entity would need to initiate a new training process or a re-training process that trains the hotword detector to accurately detect this custom hotword. Since training a hotword detector to detect any hotword is often a process that involves a large set of training data (e.g., tens of thousands of training samples) related to the hotword, training a custom hotword would similarly demand such a large set of training data related to the custom hotword. Therefore, due to the nature of training a model to detect a hotword, custom hotword configuration does not lend itself to quick generation that allows an entity to customize speech interfaces of his or her voice-enabled devices.

One issue related to hotword customization is that voice-enabled devices may be configured with a pre-trained hotword detection model. The pre-trained hotword detection model may be built and tested off-device by a remote entity. Yet to enable hotword customization, the hotword detector cannot be trained entirely off-device. An entity who wants to use a custom hotword, such as a user of the voice-enabled device or a manufacturer of the voice-enabled device, will need to train the hotword detector for the custom hotword at the voice-enabled device (e.g., in a built-on-demand approach). This poses at least two potential issues. The first issue is how to build a robust model for detecting the custom hotword at the device and the second issue is how to generate the volume of training data to ensure accuracy of the model for the custom hotword.

One such advantage of a remote entity generating a pre-trained model is that the remote entity may have access to a training data repository with training data (e.g., audio samples) or be afforded enough time to generate a volume of training data that ensures the accuracy of the hotword detector based on the pre-trained model. Here, with hotword customization, the entity, more or less, requests that the custom hotword model is built-on-demand (i.e., built at the time of the request). In order to quickly and effectively create a custom hotword model that meets this demand, the approach described herein leverages a pre-trained model. To incorporate the pre-trained model, the hotword detector uses a neural network model (e.g., a convolutional neural network (CNN)). This neural network model includes one or more layers that extract features from input data (e.g., the audio input) and classify the extracted features (e.g., to identify a hotword). A CNN refers to a neural network topology where different features are extracted through convolution using weighted filters whose weights are automatically learned during training. For example, the neural network model extracts features that may identify a presence of a hotword and weighs those features for classification of whether the hotword is present. Since the topology of a CNN may include multiple layers that each contain a different level of abstraction for features related to a hotword, a model that will detect the presence of a custom hotword may share several layers with a pre-trained model that identifies a non-customized hotword. Stated differently, using layers of the pre-trained model prevents the custom hotword model from being entirely generated from scratch. This results in the neural network model that includes one or more new layers (also referred to as a head model) for custom hotword detection combined with one or more layers from a pre-trained hotword detection model. With this type of configuration, the custom hotword model may be capable of performing efficient on-device training (e.g., with less training data than an entirely pre-trained model). Here, the head model of the custom hotword model may be trained (or re-trained) on-device to detect a custom hotword without needing to entirely re-train the base model. Practically speaking, this structure may allow a custom hotword model to be deployed at the voice-enabled device.

In some configurations, in addition to effectively deploying a custom hotword model at the voice enabled-device, the approach herein may utilize synthesized speech training data (e.g., synthesized speech training examples) to train the custom hotword model. By using synthesized speech training data, an entity who wants to create a custom hotword may generate a volume of training data that ensures accuracy of the model for the custom hotword. For instance, the entity generates some real-speech training data to train the custom hotword model and this volume of real-speech training data is supplemented by synthesized speech training data. Alternatively, the custom hotword model may be trained entirely on synthesized speech training data. Here, the synthesized speech training data may be beneficial to the training of the custom hotword model because, although the custom hotword model may take advantage of the training data repository (e.g., when training the pre-trained model portion of the custom hotword model), the head model cannot leverage this same training data repository when training for a custom hotword at the voice-enabled device. Therefore, synthetic training examples (e.g., generated by text-to-speech (TTS) systems or other synthetic audio generation systems) may improve custom hotword detection accuracy. By using one or both of these approaches (i.e., a head model and/or synthetic training data for a custom hotword), a hotword detector may be adapted to a custom hotword detector in a manner that facilitates rapid prototyping and/or on-demand customization.

Figure 1B:
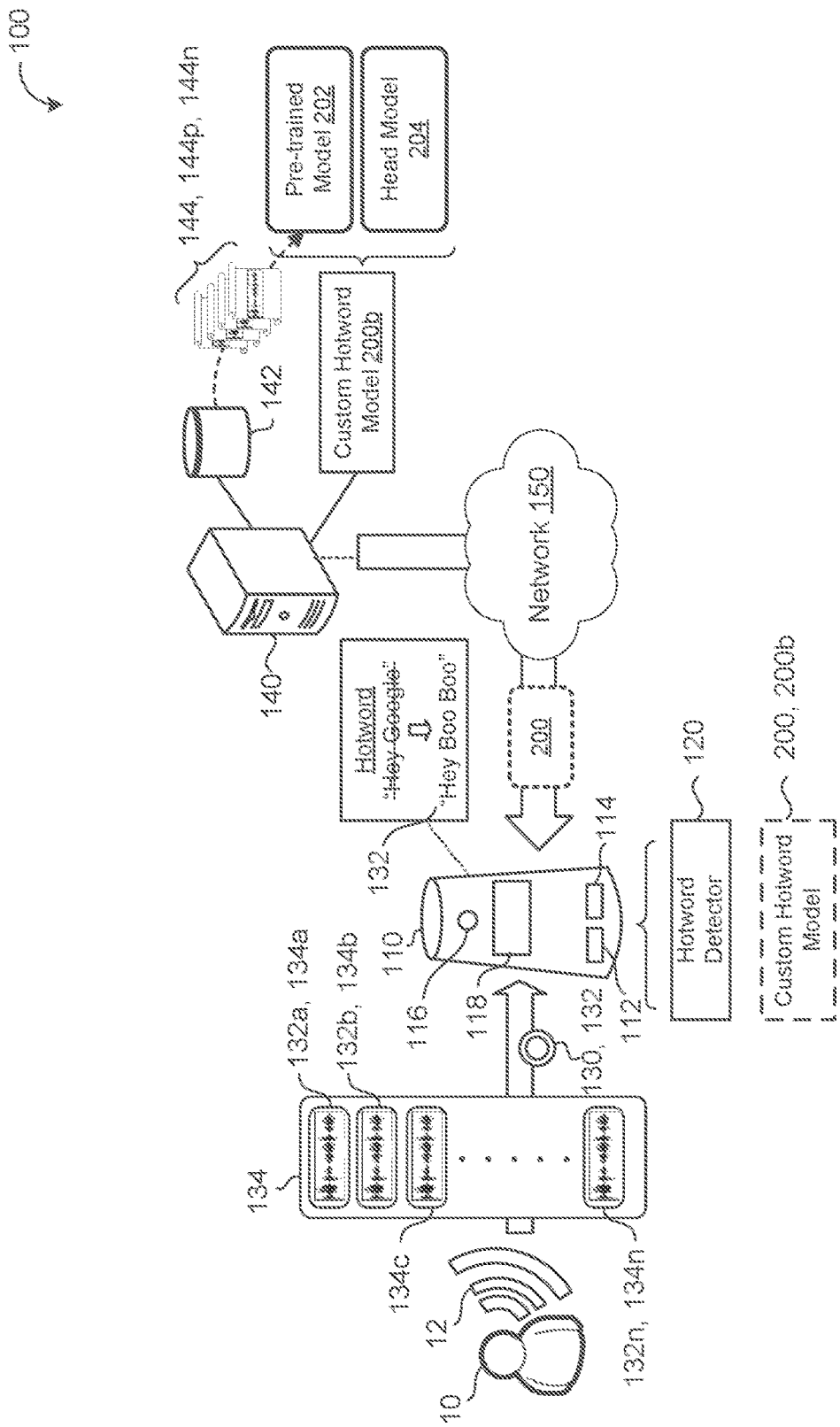
Figure 1C:
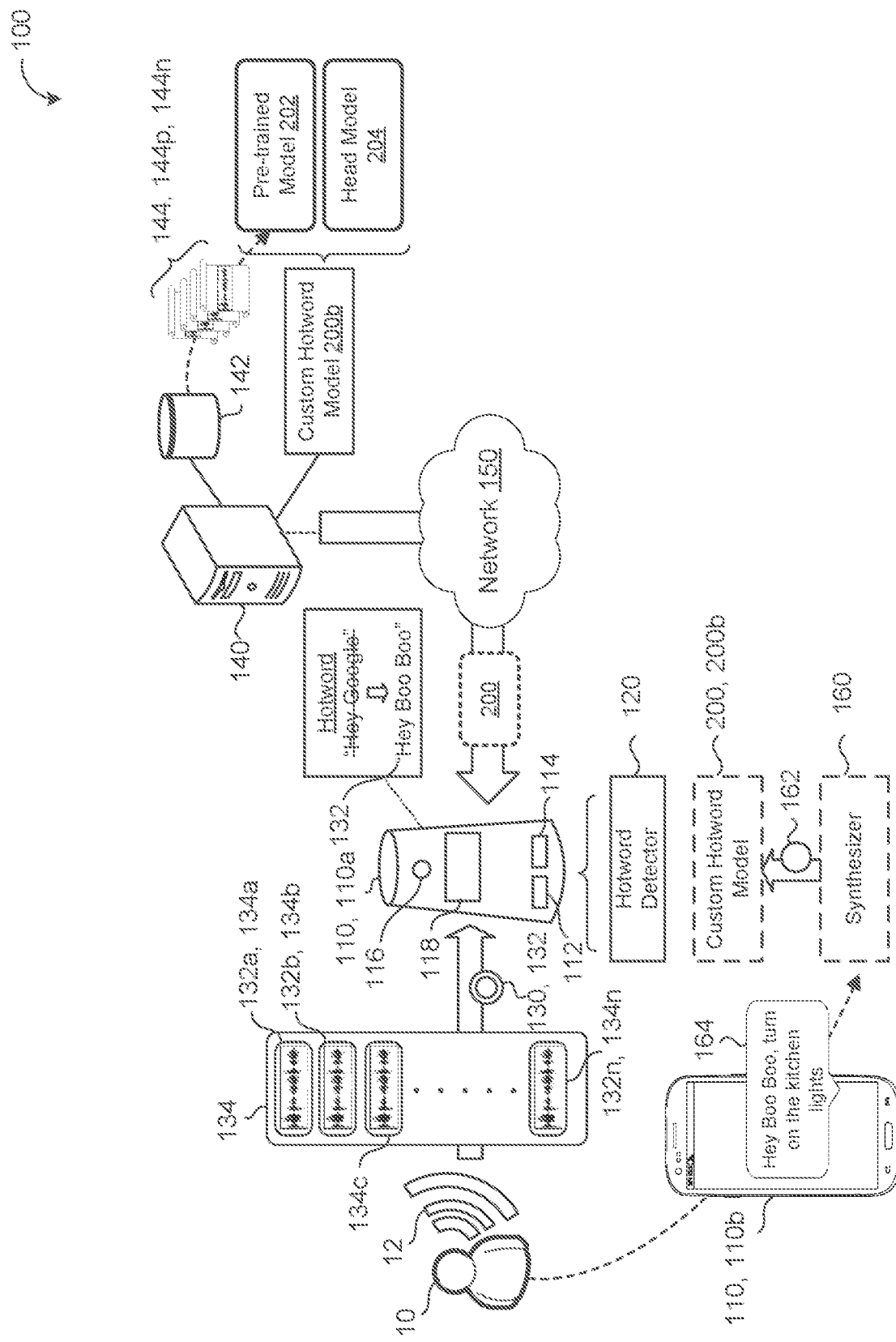

FIGS. 1A-C are examples of a speech-enabled environment 100 (also referred to as a speech-enabled system 100). In a speech-enabled environment 100, a user's manner of interacting with a computer-based system, such as a voice-enabled device 110, may be through voice input. The voice-enabled device 110 (also referred to generally as a device 110 or a user device 110) is configured to capture sounds (e.g., streaming audio data 12) from one or more users 10 within the speech-enabled environment 100. Here, the streaming audio data 12 may refer to a spoken utterance by the user 10 that functions as an audible query or a command for the device 110. The speech-enabled system 100 may field the query or the command by answering the query and/or causing the command to be performed. The user device 110 includes data processing hardware 112 and memory hardware 114 in communication with the data processing hardware 112 and storing instructions, that when executed by the data processing hardware 112, cause the data processing hardware 112 to perform one or more operations. The user device 110 further includes an audio capture device (e.g., microphone) 116 for capturing and converting spoken utterances 12 within the speech-enabled system 100 into electrical signals and a speech output device (e.g. a speaker) 118 for communicating an audible audio signal (e.g., as output audio data from the device 110).

The device 110 may be associated with the user 10 and capable of processing the audio data 12 from the associated user 10 when, for example, an utterance of the audio data 12 begins with a hotword 132. A hotword 132 may be a spoken phrase that causes the device 110 to treat a subsequently spoken phase as a voice input for the system. In other words, a hotword 132 may be a spoken phrase that explicitly indicates that a spoken input is to be treated as a voice command. Namely, a hotword 132 may be a spoken phrase that triggers endpointing, automated speech recognition (ASR), or semantic interpretation on the hotword 132 or one or more terms that follow the hotword 132. In other words, referring to a "hotword" refers to a word or phrase that is a designated hotword or sounds similar to at least a portion of the designated hotword (e.g., sounds similar to a hotword in other languages).

To detect the presence of hotwords 132 within the utterance 12, the device 110 includes a hotword detector 120. The hotword detector 120 may receive sounds (e.g., streaming audio data 12) corresponding to the utterance 12 and determine whether the utterance 12 includes a term that has been designated or assigned as a hotword 132. In some examples, the hotword detector 120 detects acoustic features of captured sound from the utterance 12. Here, when the acoustic features are characteristic of the hotword 132, the hotword detector 120 identifies the hotword 132. With the detection of a hotword 132, the hotword detector 120 may initiate the wake-up process and further processes for the device 110. In other configurations, the hotword detector 120 communicates the detection of the hotword 132 to other components of the user device 110. In some implementations in order to efficiently and to effectively detect hotwords 132, the hotword detector 120 is trained by a hotword detector model 200, 200a-b (e.g., a custom hotword model 200) with data or examples of speech to learn how to identify whether an utterance 12 includes a hotword 132.

In some examples, a user 10, such as an owner or a manufacturer of the device 110, wants to customize the hotword 132 associated with his or her device 110. To generate a custom hotword 132, the user 10 may initiate a request 130 for a custom hotword 132. For instance, FIGS. A-1C depict that initially the hotword 132 for the device 110 corresponds to the multi-word phrase "Hey Google," but that the user 10 wants to change this default hotword 132 into the custom hotword phrase of "Hey Boo Boo." In other words, the user 10 may want a custom hotword 132 that provides more comedic value to his or her children who are Yogi Bear fans. In some implementations, the request 130 corresponds to a configuration setup for a hotword 132 of the device 110.

In order to process this hotword customization request 130, a custom hotword detector 120 of the device 110 needs to be trained on the custom hotword 132. Generally speaking, prior to hotword customization, the device 110 may, by default, be configured with one or more specific hotwords 132. Here, the hotword detector 120 of the device 110 has already been trained on these default hotwords 132 (e.g., "Hey Google"). In some examples, a remote system 140 (e.g., a remote computing environment such as a cloud computing environment) communicating with the device 110 across a network 150 has already generated a hotword model 200, 200a that has been pushed or implemented on the device 110 (e.g., by training the hotword detector 120 of the device 110). In these examples, the remote system 140 may generate a robust trained hotword model 200 using a training data sample repository 142 to provide a set of training audio samples 144 to the hotword model 200*a* during training. In other words, the remote system 140 may include or amass a large set of training audio samples 144 (e.g., tens of thousands of samples) that ensure accuracy of the hotword model 200*a*.

Figure 2A:
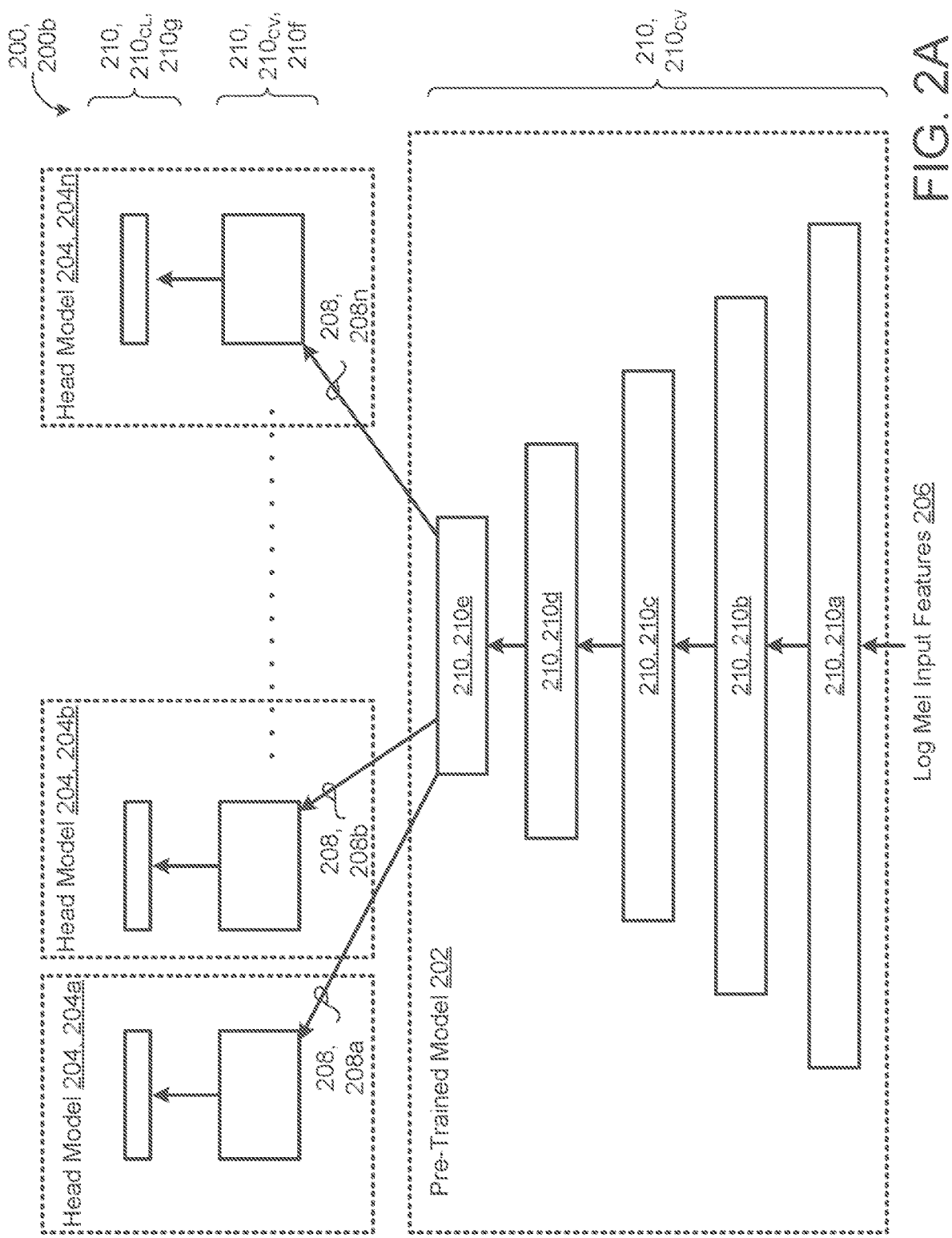
FIG. 2A is a schematic view of an example custom hotword model of FIGS. 1B and 1C.
Figure 2B:
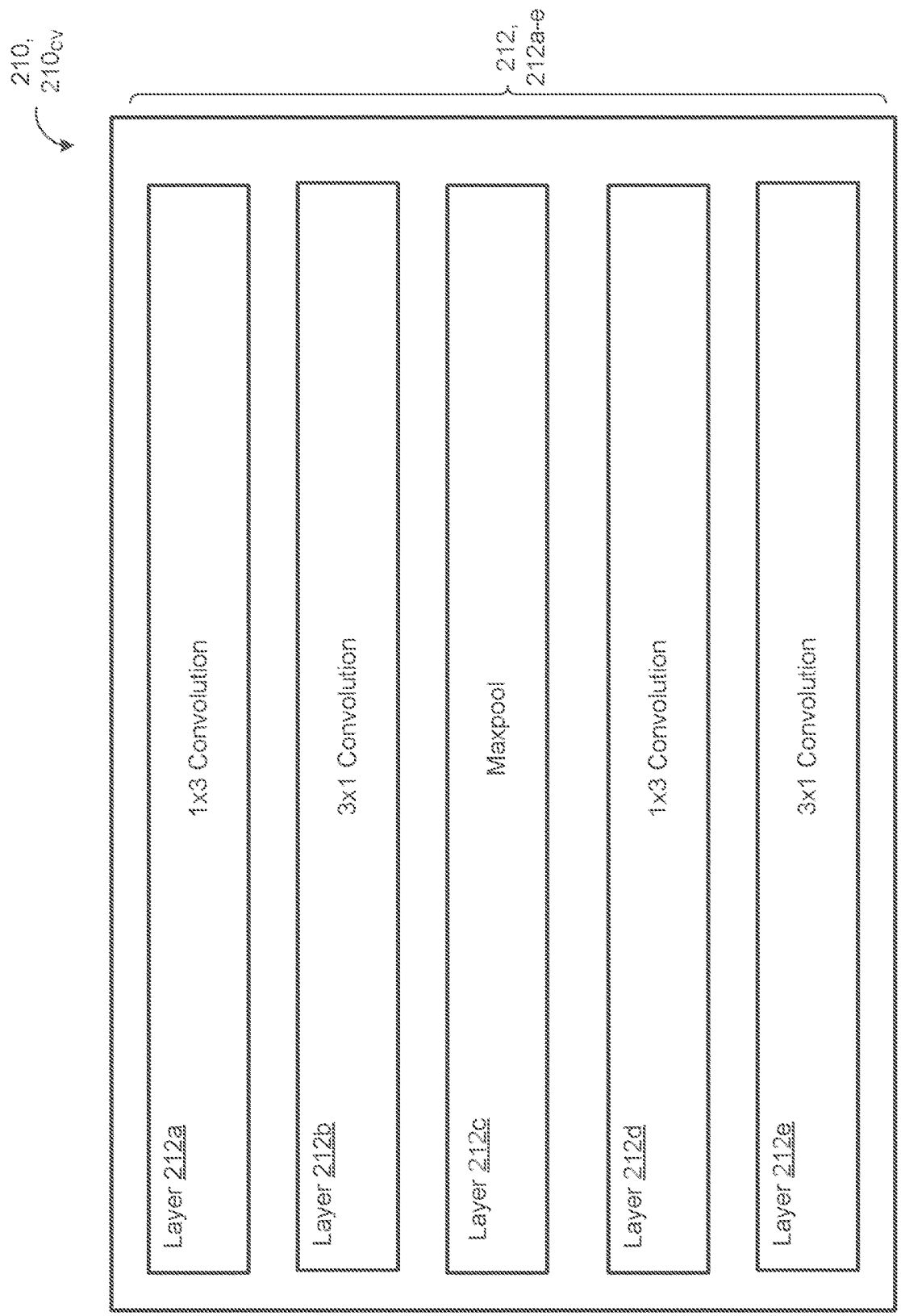
FIG. 2B is a schematic view of an example block of the custom hotword model of FIG. 2A.

Yet when the user 10 wants the device 110 to perform custom hotword detection with the hotword detector 120, the hotword model 200*a* needs to be adapted to a custom hotword model 200, 200*b* in order to identify the custom hotword 132. Since a custom hotword model 200*b* and a hotword model 200*a* may have overlapping functionality to perform hotword feature identification, the hotword customization process may leverage these similarities. For instance, the custom hotword model 200*b* may include a pre-trained model 202 (e.g., also referred to as an embedding model) and a head model 204. Here, the pre-trained model 202 (e.g., as shown in FIGS. 2A and 2B) may include convolutional layers much like the hotword model 200*a*. For instance, these convolutional layers may perform feature extraction in a similar manner whether the feature extraction is for a default hotword 132 or a custom hotword 132. In some implementations, such as FIGS. 1B and 1C, the pre-trained model 202 of the custom hotword model 200*b* is shown being trained with the set of training audio samples 144 that also trained the hotword model 200*a*. By including a portion of the pre-trained hotword model 200*a* (e.g., the pre-trained model 202), the custom hotword model 200*b* does not need to be completely trained from scratch and may take advantage of, for example, the training data sample repository 142 of the remote system 140. This may allow the custom hotword model 200*b* to still be trained on a large number of training samples even though these training samples do not necessarily include or contain the custom hotword 132.

In some configurations, the remote system 140 trains the hotword model 200*a* and/or the custom hotword model 200*b* using different types of training audio samples 144. For instance, training audio samples 144 may be positive training audio samples 144, 144*p* or negative training audio samples 144, 144*n*. A positive training audio sample 144*p* refers to a training audio sample 144 that includes a target hotword 132 (e.g., or some portion of a corpus of a target hotword 132). In contrast, a negative training audio sample 144*n* refers to a training audio sample 144 that does not contain any target hotword(s) 132. Moreover, in some implementations, in order to help generate a robust hotword model 200*a*-*b*, the training audio samples 144 are derived from multiple different speakers with varying accents or linguistic modifications. By having these types of variations in the training audio samples 144, the hotword model 200*a*-*b* may be more likely to accurately identify a hotword 132 regardless of the user 10.

In some implementations, once the remote system 140 pre-trains the pre-trained model 202 of the custom hotword model 200*b*, the remote system 140 pushes the custom hotword model 200*b* to the device 110 to complete the training process of the custom hotword model 200*b*. Since the remote system 140 cannot guess or identify what the user 10 may request to be the custom hotword 132, the remainder of the training process may occur at the device 110. In some examples, in addition to the user 10 generating the custom hotword request 130, the user 10 and/or other speakers within the speech-enabled environment 100 generate and/or provide training data specific to the custom hotword 132. For example, FIGS. 1B and 1C illustrate the user 10 providing training audio samples 134. In some configurations, the user 10 provides and/or generates training audio samples 134 that correspond to human-generated speech utterances (also referred to a real-speech) of the user 10 speaking the custom hotword 132. For instance, the user 10 speaks the custom hotword 132 a few times to generate these human-generated training audio samples 134, 134*a*-*n*. In some examples, similar to the training audio samples 142 of the remote system 140, these human-generated training audio samples 134 may include positive or negative training examples. FIGS. 1B and 1C depict a third training audio sample 134, 134*c* without the custom hotword 132 to represent a negative training sample. For training audio samples 134, the device 110 may prompt the user 10 to generate human-generated training audio samples 134 during a configuration process to setup a custom hotword 132.

In some implementations, in addition to training the custom hotword model 200*b* with human-generated training audio samples 134 at the device 110, the custom hotword model 200*b* is configured to also be trained with training audio samples that correspond to synthesized speech utterances 162 of the custom hotword 132 output from one or more speech synthesizers 160 (i.e., a text-to-speech (TTS) system). In some examples, the custom hotword model 200*b* additionally trains on synthesized speech utterances 162 to supplement the human-generated training audio samples 134. In other examples, the custom hotword model 200*b* trains entirely on synthesized speech utterances 162 at the device 110. These synthesized speech utterances 162 used to train the custom hotword model 200*b* may include one or more different synthetic voices in order to attempt to introduce the custom hotword model 200*b* to a variety of voices or linguistic differences during training.

In some configurations, such as FIG. 1C, the user device 110, 110*a* being setup for a custom hotword 132 or another user device 110, 110*b* (e.g., such as a mobile device) in the speech-enabled environment 100 receives input text corresponding to the custom hotword 132 (e.g., via a graphical interface) and generates one or more synthesized speech utterances 162 using the input text at the synthesizer 160. In some implementations, an ASR system (not shown) implemented on the device 110 or the remote system 140 receives, as input, a human-generated speech utterance 134 of the custom hotword 132, and generates, as output, a transcription 164 of the custom hotword 132 that may be provided as input to the synthesizer for generating one or more synthesized speech utterances 162 of the custom hotword 132. In the examples shown, the speech synthesizer 160 may reside on the device 110, on a remote computing system such as the remote system 140, or some combination of on the device 110 and on the remote system 140.

After training the custom hotword model 200*b*, the device 110 may receive streaming audio data 12 (e.g., spoken utterances by the user 10) captured at the audio capturing device 116 and determine, based on the trained custom hotword model 200*b* whether the audio data 12 includes the presence of the custom hotword 132. Here, when the custom hotword 132 is present in the streaming audio data 12, the device 110 initiates its wake-up process for processing the custom hotword 132 and/or one or more terms following the custom hotword 132 in the streaming audio data 12.

In some configurations, the device 110 is associated with an entity and used by the entity for initially training the custom hotword model 200*b* for detecting the presence of the custom hotword 132 using the techniques discussed above. After training the custom hotword model 200b is complete, the trained custom hotword model 200b may be implemented on a multitude of voice-enabled devices associated with the entity for use by customers and/or employees of the entity. In these configurations, the entity may select one or more custom hotwords 132 that may include, without limitation, trade names, product names, or other proprietary names unique to the entity. For instance, if the entity is an automobile manufacturer, the trained custom hotword model 200b may be implemented in infotainment systems of vehicles sold to customers of the automobile manufacture to detect the custom hotword 132 "Hey Car". In another example, the entity could include an appliance manufacturer and the trained custom hotword model 200b can be implemented on appliances sold by the appliance manufacturer to detect custom hotwords 132 such as "Dishwasher".

Referring to FIGS. 2A and 2B, the architecture of the custom hotword model 200b includes the pre-trained model 202 and the head model 204. Here, as previously stated, the assumption of this architecture is that a majority of the work required to classify a hotword 132 is independent of the actual hotword 132. Therefore, the training process for the hotword model 200a may be incorporated in the pre-trained model 202 of the custom hotword model 200b (e.g., as a shared embedding model). Each portion 202, 204 of the custom hotword model 200b includes one or more blocks 210. When the custom hotword model 200b has a CNN topology, each block 210 is either a convolution block 210, $210_{CV}$ or a classification block 210, $210_{CL}$. Generally speaking, a convolution block $210_{CV}$ performs feature extraction, while a classification block $210_{CL}$ classifies extracted features (e.g., classifies an embedding of the extracted features). In some examples, the custom hotword model 200b at the pre-trained model 202 receives, as an input, log mel input features 206. For example, the custom hotword model 200b runs on top of a low footprint feature extractor that provides a thirty-two dimensional log mel feature vector as the log mel input feature 206. The log mel feature vector may cover an audio frequency ranging from 60 Hz to 3800 Hz that is quantized to eight bits every ten milliseconds.

The pre-trained model 202, which is also referred to as an embedding model, is configured to convert a stream of audio (e.g., audio data 12) represented by the log mel input features 206 into an embedding 208, 208a-n (e.g., a dimensional feature vector). When training the pre-trained model 202, multiple head models 204, 204a-n may be used. For example, each head model 204 corresponds to different groups of target hotwords 132 that are trained in parallel on top of the pre-trained model 202. In some implementations, a number of target hotwords 132 may be partitioned into a plurality of random groups of target hotwords 132. For instance, FIG. 2A depicts three random groups of target hotwords 132 corresponding to the head models 204a, 204b-n. Each of these groups of target hotwords 132 may include a set of one or more target hotwords 132 from the body of all target hotwords 132. This approach may allow the pre-trained model 202 to learn an embedding 208 that may be useful for any arbitrary group of hotwords 132. In other words, by training the pre-trained model 202 with multiple, parallel head models 204 (e.g., with random target hotword groups), the pre-trained model 202 is trained such that its embedding output is not useful to a specific hotword, but rather universally useful to any later defined hotword 132 (e.g., a custom hotword 132). In some implementations, after training the pre-trained model 202, the multiple, parallel head models 204 are discarded in order to later be usefully trained to classify the custom hotword 132 at the device 110.

With continued reference to FIG. 2A, the pre-trained model 202 includes five convolutional blocks $210_{CV}$, 210a-e With a convolutional structure, the output of a convolutional block 210 is fed as the input into the subsequent convolution block $210_{n+1}$. For example, the output of a first convolutional block 210, 210a is fed as an input into a second convolution block 210, 210b The output of the second convolutional block 210b is then fed as an input into a third convolutional block 210, 210c. The output of the third convolutional block 210c is fed, as an input, into a fourth convolutional block 210, 210d. The output of the fourth convolutional block 210d is fed as an input into the fifth and final convolutional block 210, 210e of the pre-trained model 202. With this five stage or five block convolution process, the pre-trained model 202 generates one or more hotword embeddings 208.

As shown in FIG. 2B, each convolutional block $210_{CV}$ may be further subdivided into layers 212. For instance, a convolutional block $210_{CV}$ is divided into four convolution layers 212, 212a,b,d,e with a maxpooling layer 212, 212c. In some examples, much like the order of the blocks 210, the order of the convolution layers 212 proceeds sequentially from the first layer 212a to the fifth layer 212e. Here, during convolution for each block 210, the convolution process first performs 1×3 convolution at the first layer 212a then performs a 3×1 convolution at a second layer 212, 212b followed by a maxpooling operation at a third layer 212, 212c then followed by a 1×3 convolution at a fourth layer 212, 212d and subsequently a 3×1 convolution at the fifth layer 212e. These convolution operations may also be compounded over one or more channels for each block 210.

With continued reference to FIG. 2A, in some examples, the head model 204 includes a single convolution block $210_{CV}$, 210f and a single classification block $210_{CL}$, 210g. In this structure, the convolution block $210_{CV}$, 210f receives, as an input, the output of the fifth convolution block 210, 210e of the pre-trained model 202 (e.g., the hotword embedding 208) and the classification block $210_{CL}$, 210g receives, as an input, the output from the convolution block $210_{CV}$, 210f. Here, the classification block $210_{CL}$, 210g may either be a maxpool layer 212 followed by a 1×1 convolution when a continuous stream of predictions are required from the head model 204 or a maxpool layer 212 followed by a fully connected layer 212.

Once the remote system 140 trains the pre-trained model 202 (i.e., the embedding model 202), the custom hotword model 200b is pushed to the device 110. The custom hotword model 200b may then proceed to be additionally trained at the device 110 based on one or more specific custom hotwords 132. For instance, when the device 110 receives a request 130 to generate a custom hotword 132, the pre-trained model 202 generates a hotword embedding 208 for each training audio sample (e.g., human-generated speech 134 or synthesized speech 162). The pre-trained model 202 is able to quickly generate a meaningful hotword embedding 208 for a training audio sample due to the remote system 140 previously training the pre-trained model 202 to generate arbitrarily useful hotword embeddings 208 based on a number of training audio samples 144 greater than the training audio samples generated at the device 110. With an embedding 208 for each training audio sample, the head model 204 receives these embeddings 208 as an input and classifies each embedding 208 as corresponding to the custom hotword 132. Based on this approach the custom hotword model 200b is trained and deployed at the hotword detector 120 to subsequently identify the custom hotword 132 that it is trained to detect.

Figure 3:
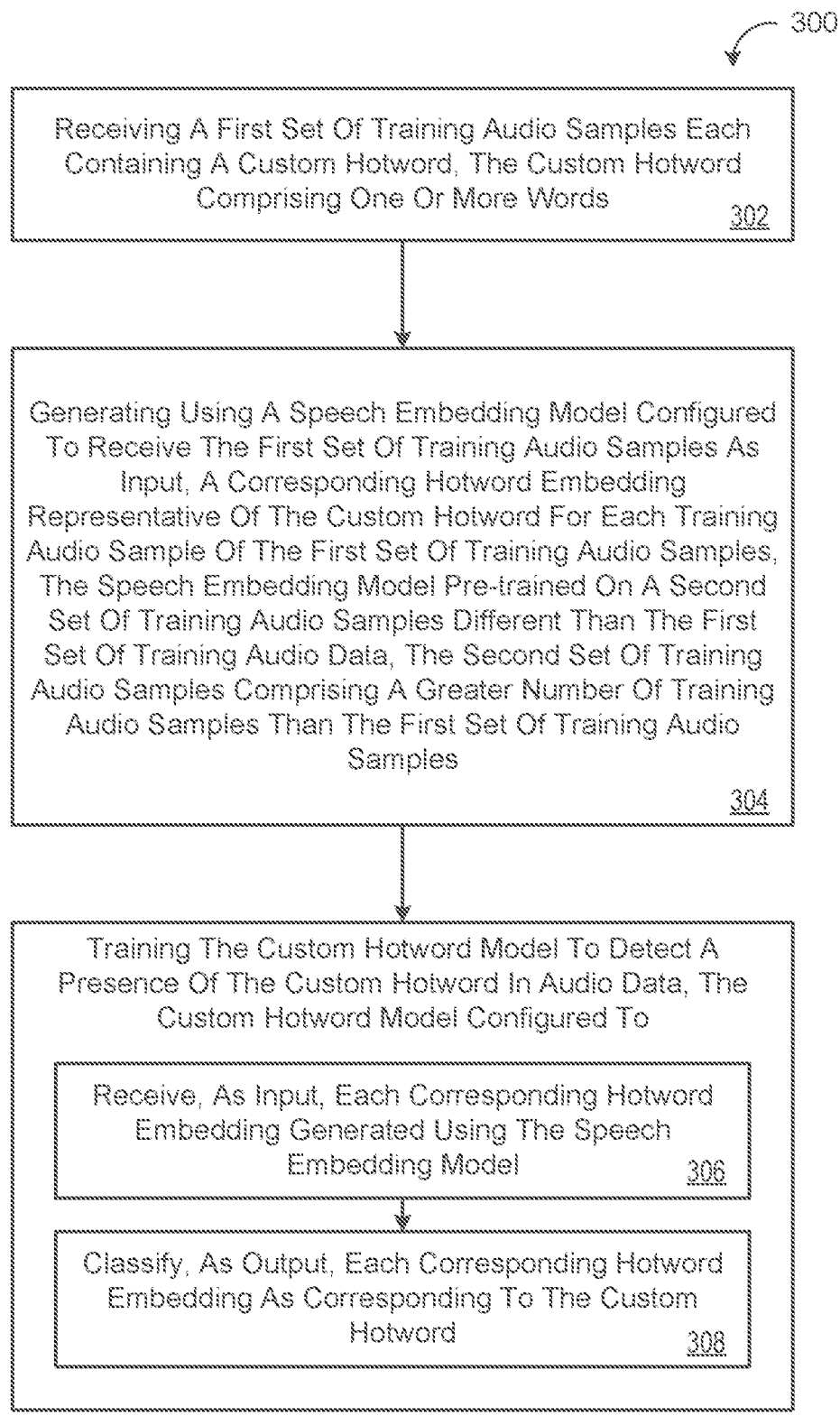
FIG. 3 is a flowchart of an example arrangement of operations for a method of training a custom hotword model.

FIG. 3 is an example of a method 300 for training a custom hotword model. At operation 302, the method 300 receives a first set of training audio samples 134, 162 each containing a custom hotword 132. The custom hotword 132 includes one or more words. At operation 304, the method 300 generates using a speech embedding model 202 configured to receive the first set of training audio samples 134, 162 as input, a corresponding hotword embedding 208 representative of the custom hotword 132 for each training audio sample 134, 162 of the first set of training audio samples 134, 162. The speech embedding model 202 is pre-trained on a second set of training audio samples 144 different than the first set of training audio data 134, 162. The second set of training audio samples 144 including a greater number of training audio samples than the first set of training audio samples 134, 162. At operation 306, the method 300 trains the custom hotword model 200b to detect a presence of the custom hotword 132 in audio data 12. At operation 308, the custom hotword model 200b is configured to receive, as input, each corresponding hotword embedding 208 generated using the speech embedding model 202. At operation 310, the custom hotword model 200b is also configured to classify, as output, each corresponding hotword embedding 208 as corresponding to the custom hotword 132.

Figure 4:
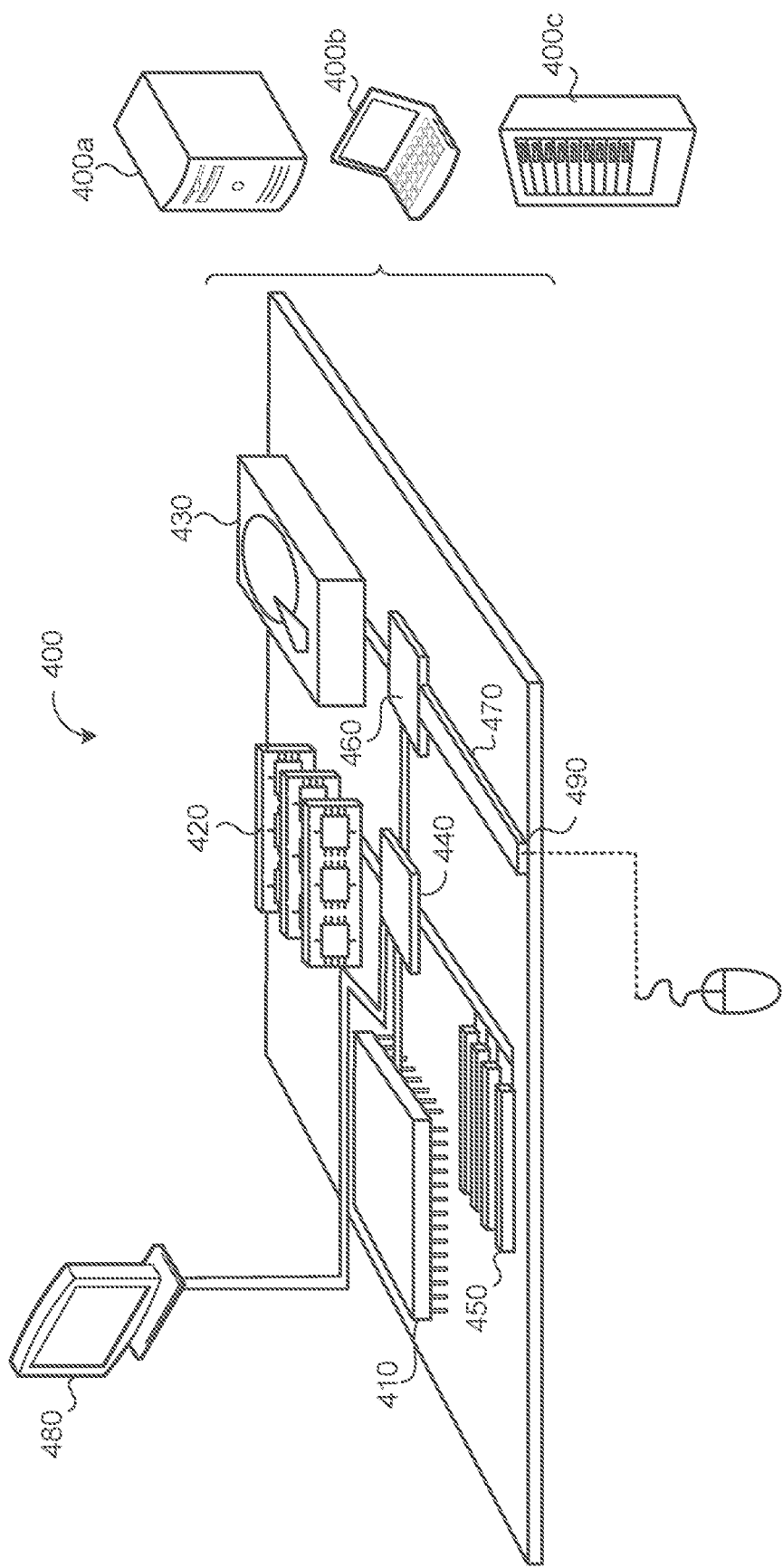
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices, magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method of training a custom hotword model, the method comprising:
receiving, at data processing hardware, a first set of training audio samples each containing a custom hotword, the custom hotword comprising one or more words;
generating, by the data processing hardware, using a speech embedding model configured to receive the first set of training audio samples as input, a corresponding hotword embedding representative of the custom hotword for each training audio sample of the first set of training audio samples, the speech embedding model pre-trained on a second set of training audio samples different than the first set of training audio data, the second set of training audio samples comprising a greater number of training audio samples than the first set of training audio samples; and
training, by the data processing hardware, the custom hotword model to detect a presence of the custom hotword in audio data, the custom hotword model configured to:
receive, as input, each corresponding hotword embedding generated using the speech embedding model; and
classify, as output, each corresponding hotword embedding as corresponding to the custom hotword.

2. The method of claim 1, further comprising, after training the custom hotword model:
receiving, at the data processing hardware residing on a user device, streaming audio data captured by the user device;
determining, by the data processing hardware, using the trained custom hotword model, whether the custom hotword is present in the streaming audio data; and
when the custom hotword is present in the streaming audio data, initiating, by the data processing hardware, a wake-up process on the user device for processing the custom hotword and/or one or more other terms following the custom hotword in the streaming audio data.

3. The method of claim 1, wherein a remote system pre-trains the speech embedding model on the second set of training audio samples, the second set of training audio samples comprising:
positive training audio samples containing a corpus of target hotwords spoken by one or more different speakers; and
negative training audio samples not containing any of the target hotwords from the corpus of target hotwords.

4. The method of claim 3, wherein the remote system is further configured to pre-train the speech embedding model by:
partitioning the corpus of target hotwords into a plurality of random groups of target hotwords, each group of target hotwords comprising a respective set of one or more target hotwords from the corpus of target hotwords;
for each group of target hotwords partitioned from the corpus of target hotwords, training a respective pre-training hotword model on top of the speech embedding model to detect a presence of any of the target hotwords from the respective group of target hotwords in the second set of training audio samples; and
training the speech embedding model to learn a representative speech embedding for the plurality of random groups of target hotwords.

5. The method of claim 1, wherein the first set of training audio samples comprise synthesized speech utterances of the custom hotword output from one or more speech synthesis systems.

6. The method of claim 1, wherein the first set of training audio samples comprise:
one or more human-generated speech utterances corresponding to a user speaking the custom hotword; and
a plurality of synthesized speech utterances of the custom hotword output from one or more speech synthesis systems.

7. The method of claim 6, wherein at least one synthesized speech utterance of the plurality of synthesized speech utterances comprises a different synthetic voice than the other synthesized speech utterances of the plurality of synthesized speech utterances.

8. The method of claim 5, further comprising:
receiving, at the data processing hardware, input text corresponding to the custom hotword, the input text input by a user via a graphical user interface executing on the data processing hardware; and
generating, by the data processing hardware, using the input text as input to the one or more speech synthesis systems, the plurality of synthesized speech utterances of the custom hotword.

9. The method of claim 5, further comprising:
receiving, at the data processing hardware, the one or more human-generated speech utterances corresponding to the user speaking the custom hotword;
generating, by the data processing hardware, a transcription of at least one of the one or more human-generated speech utterances; and
generating, by the data processing hardware, using the transcription of the at least one of the one or more human-generated speech utterances as input to the one or more speech synthesis systems, the plurality of synthesized speech utterances of the custom hotword.

10. The method of claim 1, wherein:
the speech embedding model comprises five convolutional blocks; and
the custom hotword model comprises:
one convolutional block configured to receive, as input, an output from a last convolutional of the five convolutional blocks of the speech embedding model; and
a classification block configured to receive, as input, an output from the convolutional block.

11. The method of claim 10, wherein each convolutional block of the speech embedding model and the custom hotword model comprises four convolutional layers and a maxpool layer.

12. The method of claim 10, wherein the classification block of the custom hotword model comprises a maxpool layer followed by one of a convolutional layer or a fully connected layer.

13. The method of claim 1, wherein the data processing hardware resides on a user device associated with a user.

14. The method of claim 13, wherein a user of the user device assigns the custom hotword to the user device.

15. A system comprising:
data processing hardware; and
memory hardware in communication with the data processing hardware, the memory hardware storing instructions that when executed on the data processing hardware cause the data processing hardware to perform operations comprising:
receiving a first set of training audio samples each containing a custom hotword, the custom hotword comprising one or more words;
generating using a speech embedding model configured to receive the first set of training audio samples as input, a corresponding hotword embedding representative of the custom hotword for each training audio sample of the first set of training audio samples, the speech embedding model pre-trained on a second set of training audio samples different than the first set of training audio data, the second set of training audio samples comprising a greater number of training audio samples than the first set of training audio samples; and
training the custom hotword model to detect a presence of the custom hotword in audio data, the custom hotword model configured to:
receive, as input, each corresponding hotword embedding generated using the speech embedding model; and
classify, as output, each corresponding hotword embedding as corresponding to the custom hotword.

16. The system of claim 15, wherein the operations further comprise, after training the custom hotword model:
receiving, on a user device, streaming audio data captured by the user device;
determining using the trained custom hotword model, whether the custom hotword is present in the streaming audio data; and
when the custom hotword is present in the streaming audio data, initiating a wake-up process on the user device for processing the custom hotword and/or one or more other terms following the custom hotword in the streaming audio data.

17. The system of claim 15, wherein a remote system pre-trains the speech embedding model on the second set of training audio samples, the second set of training audio samples comprising:
positive training audio samples containing a corpus of target hotwords spoken by one or more different speakers; and
negative training audio samples not containing any of the target hotwords from the corpus of target hotwords.

18. The system of claim 17, wherein the remote system is further configured to pre-train the speech embedding model by:
partitioning the corpus of target hotwords into a plurality of random groups of target hotwords, each group of target hotwords comprising a respective set of one or more target hotwords from the corpus of target hotwords;
for each group of target hotwords partitioned from the corpus of target hotwords, training a respective pre-training hotword model on top of the speech embedding model to detect a presence of any of the target hotwords from the respective group of target hotwords in the second set of training audio samples; and
training the speech embedding model to learn a representative speech embedding for the plurality of random groups of target hotwords.

19. The system of claim 15, wherein the first set of training audio samples comprise synthesized speech utterances of the custom hotword output from one or more speech synthesis systems.

20. The system of claim 15, wherein the first set of training audio samples comprise:
one or more human-generated speech utterances corresponding to a user speaking the custom hotword; and
a plurality of synthesized speech utterances of the custom hotword output from the one or more speech synthesis systems.

21. The system of claim 20, wherein at least one synthesized speech utterance of the plurality of synthesized speech utterances comprises a different synthetic voice than the other synthesized speech utterances of the plurality of synthesized speech utterances.

22. The system of claim 19, wherein the operations further comprise:
  receiving input text corresponding to the custom hotword, the input text input by a user via a graphical user interface executing on the data processing hardware; and
  generating using the input text as input to the one or more speech synthesis systems, the plurality of synthesized speech utterances of the custom hotword.

23. The system of claim 19, wherein the operations further comprise:
  receiving the one or more human-generated speech utterances corresponding to the user speaking the custom hotword;
  generating a transcription of at least one of the one or more human-generated speech utterances; and
  generating using the transcription of the at least one of the one or more human-generated speech utterances as input to the one or more speech synthesis systems, the plurality of synthesized speech utterances of the custom hotword.

24. The system of claim 15, wherein:
  the speech embedding model comprises five convolutional blocks; and
  the custom hotword model comprises:
    one convolutional block configured to receive, as input, an output from a last convolutional of the five convolutional blocks of the speech embedding model; and
    a classification block configured to receive, as input, an output from the convolutional block.

25. The system of claim 24, wherein each convolutional block of the speech embedding model and the custom hotword model comprises four convolutional layers and a maxpool layer.

26. The system of any of claim 24, wherein the classification block of the custom hotword model comprises a maxpool layer followed by one of a convolutional layer or a fully connected layer.

27. The system of claim 15, wherein the data processing hardware resides on a user device associated with a user.

28. The system of claim 27, wherein a user of the user device assigns the custom hotword to the user device.

* * * * *